United States Patent
De et al.

(10) Patent No.: US 8,115,444 B2
(45) Date of Patent: Feb. 14, 2012

(54) COMMON MODE FILTER FOR MOTOR CONTROLLERS

(75) Inventors: Sukumar De, Bangalore (IN);
Kamalesh Hatua, Shibpur-Howrah (IN);
Milan M R Rajne, Bangalore (IN)

(73) Assignee: Honeywell International, Inc., Morristown, NJ (US)

( * ) Notice: Subject to any disclaimer, the term of this patent is extended or adjusted under 35 U.S.C. 154(b) by 1063 days.

(21) Appl. No.: 11/444,188

(22) Filed: May 31, 2006

(65) Prior Publication Data

US 2007/0278988 A1    Dec. 6, 2007

(51) Int. Cl.
*H02P 27/04*    (2006.01)

(52) U.S. Cl. ............ 318/801; 318/803; 363/34; 363/37

(58) Field of Classification Search ............ 318/801, 318/803; 363/34, 37
See application file for complete search history.

(56) References Cited

U.S. PATENT DOCUMENTS

| | | | | |
|---|---|---|---|---|
| 5,661,390 | A * | 8/1997 | Lipo et al. ............ | 318/803 |
| 6,154,378 | A * | 11/2000 | Peterson et al. ............ | 363/37 |
| 6,377,479 | B1 | 4/2002 | Ayano et al. | |
| 6,459,597 | B1 | 10/2002 | Igarashi et al. | |
| 2003/0038699 | A1 | 2/2003 | Nakatsu et al. | |
| 2004/0130923 | A1 | 7/2004 | Yin Ho et al. | |

OTHER PUBLICATIONS

Akagi, H., et al., "An approach to eliminating high-frequency shaft voltage and ground leakage current from an inverter-driven motor", *IEEE Transactions on Industry Applications*, 40(4), (Jul.-Aug. 2004),1162-1169.

Akagi, H., et al., "Design and performance of a passive EMI filter for use with a voltage-source PWM inverter having sinusoidal output voltage and zero common-mode voltage", *IEEE Transactions on Power Electronics*, 19(4), (Jul. 2004),1069-1076.

Bhattacharya, S., et al., "Experimental comparison of motor bearing currents with PWM hard and soft-switched voltage-source inverters", *IEEE Transactions on Power Electronics*, 14(3), (May 1999),552-562.

Hanigovszki, N., et al., "A novel output filter topology to reduce motor overvoltage", *IEEE Transactions on Industry Applications*, 40(3), (May-Jun. 2004),845-852.

Ran, L., et al., "Conducted electromagnetic emissions in induction motor drive systems. I. Time domain analysis and identification of dominant modes", *IEEE Transactions on Power Electronics*, 13(4), (Jul. 1998),757-767.

Ran, L., et al., "Conducted electromagnetic emissions in induction motor drive systems. II. Frequency domain models", *IEEE Transactions on Power Electronics*, 13(4), (Jul. 1998),768-776.

* cited by examiner

*Primary Examiner* — Walter Benson
*Assistant Examiner* — Erick Glass
(74) *Attorney, Agent, or Firm* — Miriam Jackson, Esq.

(57) ABSTRACT

A motor drive circuit has a converter for coupling to an AC voltage source and an inverter coupled to the converter for providing a drive current for a motor. A common mode circulation loop is coupled to the converter and to the inverter, and circulates common mode current from both the converter and the inverter.

18 Claims, 8 Drawing Sheets

COMMON MODE FILTER FOR MOTOR CONTROLLERS

BACKGROUND

When an induction motor is driven by an inverter, it injects common mode voltage into the motor. This voltage causes a common mode current to flow through the motor, inverter, and a system ground. The current may cause conducted EMI test failure of the drive. In an inverter driven motor controller, the sources of the common mode noise are AC/DC converter and DC/AC inverter. It is required to suppress both of them by common mode filters. These filters require energy storing elements such as inductors and capacitors.

SUMMARY

A common path is provided for common mode current for both a converter and inverter for an inverter driven motor. A common loop is created around both the converter and the inverter by the use of passive elements.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description is, therefore, not to be taken in a limited sense, and the scope of the present invention is defined by the appended claims.

Figure 1:
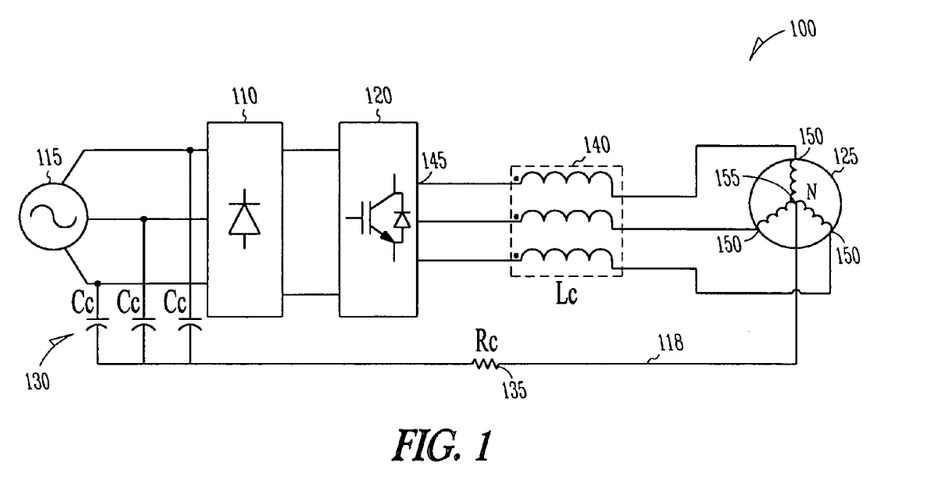
FIG. 1 is a circuit diagram of a motor drive circuit having a common mode current loop according to an example embodiment.

FIG. 1 shows a circuit schematic of one embodiment of a common mode current loop for a motor drive circuit, generally at 100. The motor drive circuit comprises an AC to DC converter 110 having terminals for coupling to a three phase voltage source 115, and a current loop 118. Converter 110 is coupled to an inverter 120 that provides an AC signal to a motor 125. The main AC source 115 can be a generator or transformer or a power grid. AC/DC converter 110 is a converter that converts AC input voltage to fixed DC voltage for the inverter 120. The AC/DC rectifier or converter 110 may have different topologies like six pulse rectifier, twelve pulse rectifier, eighteen pulse rectifiers, front end converter etc. Inverter 120 converts DC voltage to AC output voltage, which drives the three-phase motor 125. The three-phase inverter 120 may use any controlled switch, like an insulated gate biopolar transistor (IGBT) or metal oxide semiconductor field effect transistor (MOSFET), Transistor, Thyristor etc. Three-phase motor 125 may be induction motor, synchronous motor, Permanent Magnet Synchronous Motor (PMSM) etc.

In the present embodiment, the common mode current loop 118 is connected to both the converter 110 and inverter 120 to handle common mode current. Passive elements are used in the current loop in various embodiments. Current loop 118 comprises a common mode inductor (Lc) at 140, resistor (Rc) at 135 and capacitor (Cc) at 150, which are used to eliminate both the common mode current generated by the converter 110 and inverter 120. Lc 140 is connected at the output terminal 145 of the inverter 120. The other end of it is connected at a motor input terminal 150. Rc 135 is connected between a motor neutral point 155 and a star point of the Cc 130. Cc 130 are terminated at the AC side of the converter 110. The entire common mode current circulates in the loop 118. It should be noted that when one capacitor, or inductor is mentioned, it may be referring to multiple capacitors or inductors corresponding to multiple signal lines from a device, as indicated in the Figures.

The passive elements, L and C, in the common mode current loop act as a second order filter to the common mode voltage generated by the rectifier-inverter system. This attenuates the common mode voltage at the motor terminal. The common mode loop current circulates within the filter loop and does not flow through the system ground. To determine the values of L and C in the common mode loop, the resonant frequency of the L-C filter and ratio of L-value to C-value is decided first. In one embodiment, selecting a resonant frequency in the range of one-third to one-half of switching frequency of the inverter gives the best performance and does not create any resonance with the system. The L/C ratio may be chosen anywhere between unity to a very high value of 100,000. Higher values of L/C ration leads to high inductance value and low capacitance value. This helps in reducing the magnitude of circulating current in the common mode loop. With a high value of L/C ratio, though the inductance value is high, the inductor size may be lower as the magnitude of circulating current reduces. A designer with average skill in the subject may optimize the design by proper choice of L/C ratio, so as to minimize the size of overall filter. The value of the resistance may be determined to ensure proper damping of the common mode filter loop. This may be determined using the following equation: $-R=(\text{damping factor})*\sqrt{L/C}$. Typically, the damping factor is chosen about 0.7 to 1.0. The procedure for selecting the values of L, C and R in the common mode filter loop, as detailed above, remains same for all the embodiments of present invention.

Figure 2:
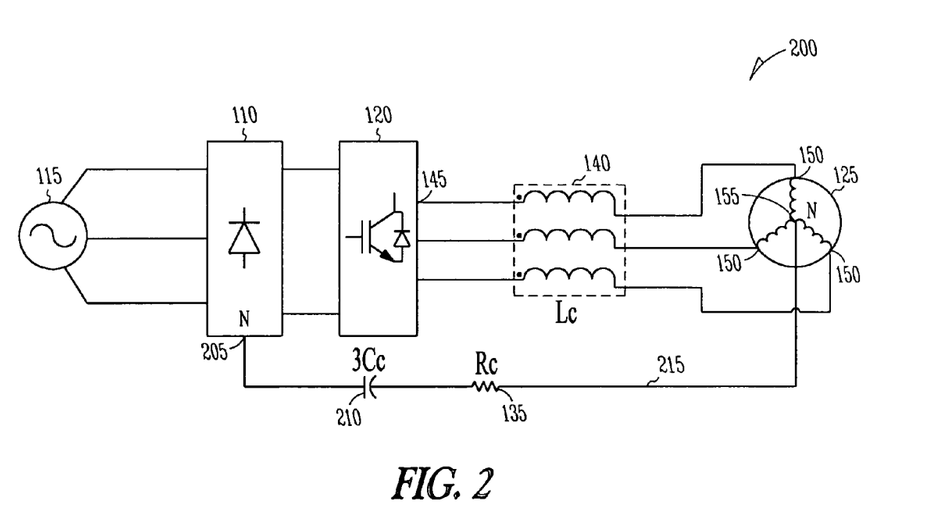
FIG. 2 is an alternative circuit diagram of a motor drive circuit having a common mode current loop according to an example embodiment.

A second embodiment is illustrated in FIG. 2 at 200. Numbering between the figures is the same for the motor drive components and elements of the current loop that are consistently positioned with loop 118 in FIG. 1. For an Autotransformer Rectifier Unit (ATRU) it is possible to access a neutral point of the system at 205. This enables Rc 135 to be terminated in a capacitor 3Cc at 210, and 3Cc 210 to be terminated in the neutral point 205 of the converter 110. Common mode current from both the converter 110 and inverter 120 is handled by these common mode current components of a current loop 215.

Figure 3:
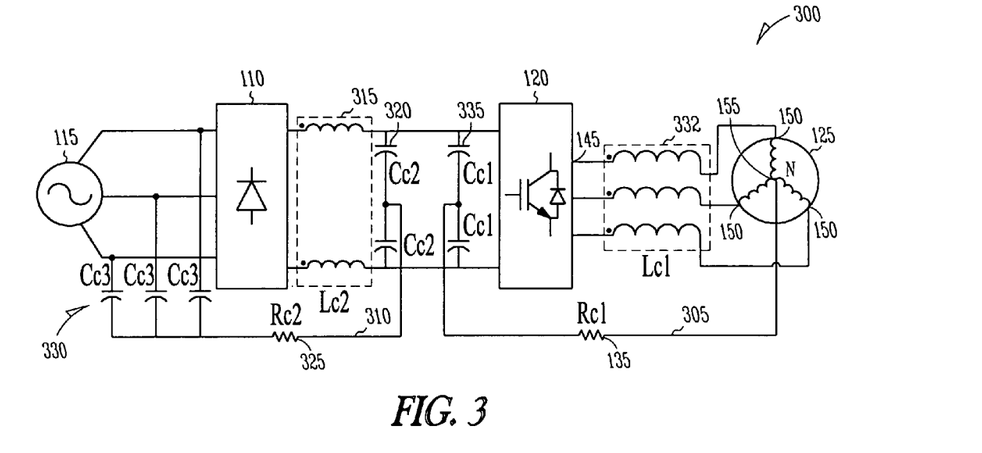
FIG. 3 is a further alternative circuit diagram of a motor drive circuit having a common mode current loop according to an example embodiment.

In an embodiment 300 in FIG. 3, two separate loops 305 and 310 are created to circulate common mode current. Common mode inductors (Lc2) at 315 is coupled between an output of converter 110 and input of inverter 120. Capacitors (Cc2) at 320 is coupled between inductors (Lc2) at 315 and resistor (Rc2) 325. Resistor (Rc2) 325 is coupled to capacitors (Cc3) at 330. These components comprise loop 310 that handle the converter 110 injected common mode noise.

Inductor Lc1 332 is coupled to output 145 of inverter 120 and inputs 150 of motor 125. Together with resistor Rc1 135 and capacitors Cc1 at 335, which are coupled to resistor Rc1 135 and the input to inverter 120, create path 305 for the inverter 120 injected common mode noise.

Figure 4:
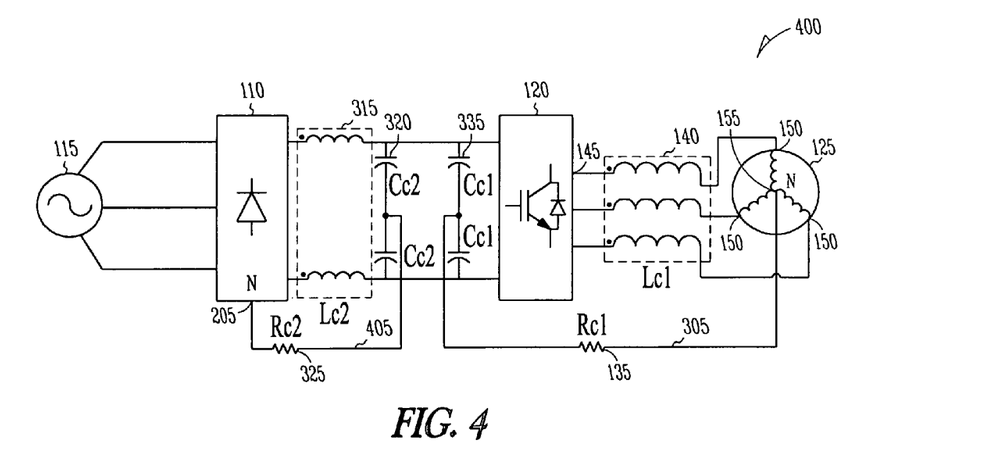
FIG. 4 is a further alternative circuit diagram of a motor drive circuit having a common mode current loop according to an example embodiment.

An embodiment 400 in FIG. 4 is created by modifying circuit 300. Circuit 400 has Rc2 325 terminated at the neutral point 205 of the AC/DC converter 110 to create loop 405. The rest of the circuit remains the same as circuit 300, having two separate loops 305 and 405.

Figure 5:
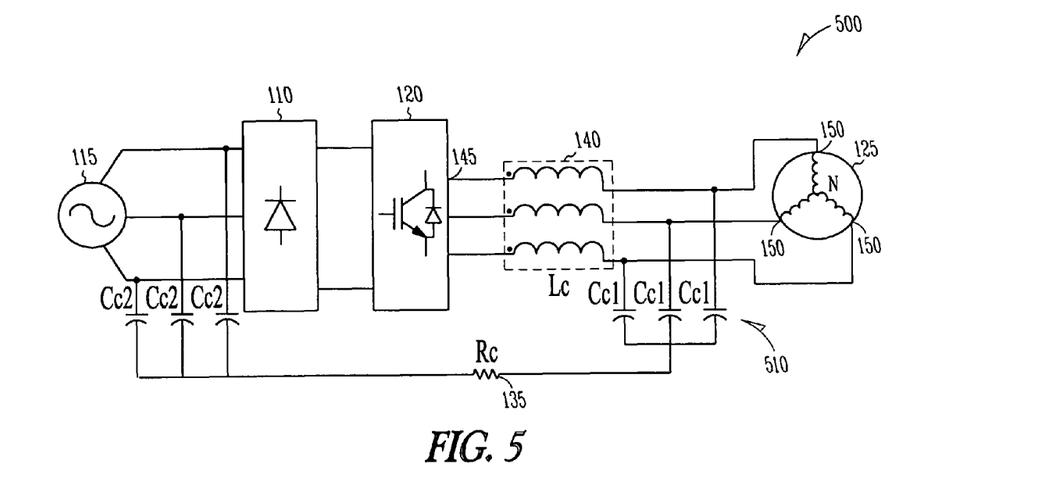
FIG. 5 is a further alternative circuit diagram of a motor drive circuit having a common mode current loop according to an example embodiment.

An embodiment 500 in FIG. 5 the common mode inductor (Lc) 140 is connected to the three-phase motor 125. Three capacitors (Cc1) at 510 are connected between corresponding Lcs, and the input terminals 150 of the motor 125. The other ends of the capacitors 510 are tied up and connected to a damping resistor (Rc) at 135. The other end of resistor Rc is connected to a common point of three capacitor Cc2 at 515. Cc2 at 515 is again terminated to the input of the AC/DC converter 110.

Figure 6:
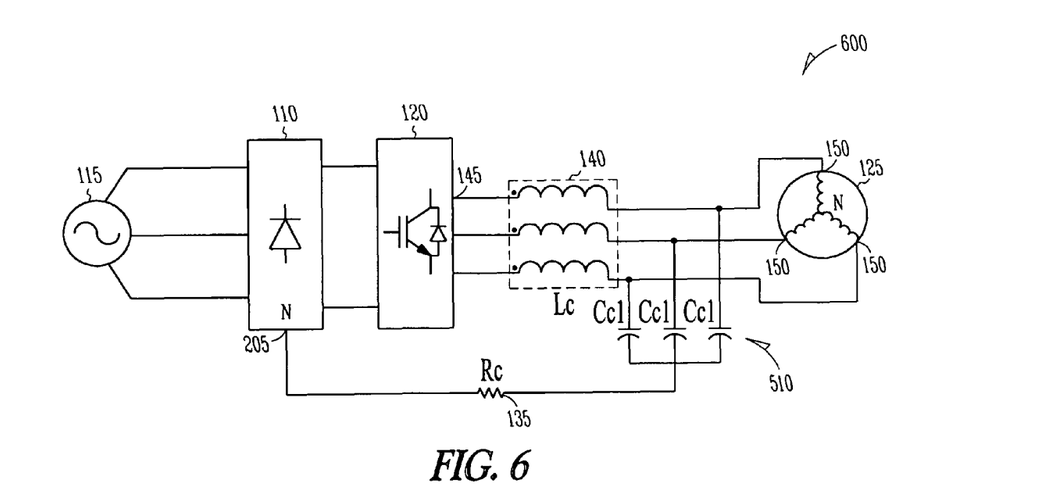
FIG. 6 is a further alternative circuit diagram of a motor drive circuit having a common mode current loop according to an example embodiment.

An embodiment 600 in FIG. 6 is created by modifying embodiment 500. For Autotransformer Rectifier Unit (ATRU), converter 110 it is possible to access the neutral of the system at 205. Rc 135 is terminated in the neutral point 205 of the converter 110.

Figure 7:
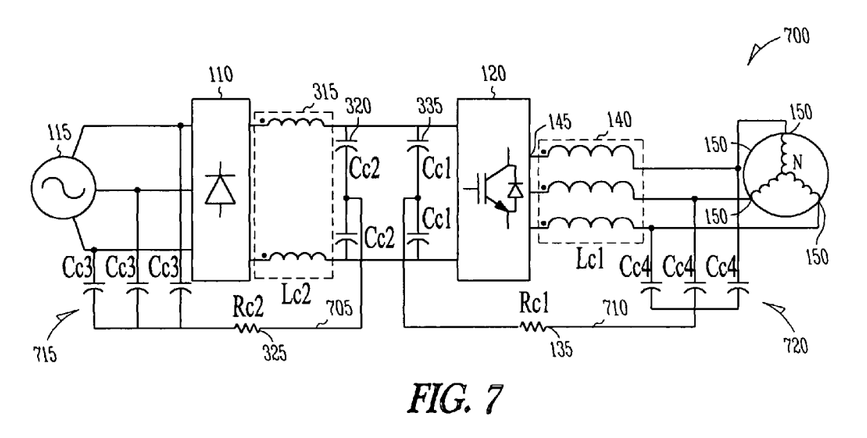
FIG. 7 is a further alternative circuit diagram of a motor drive circuit having a common mode current loop according to an example embodiment.

An embodiment 700 in FIG. 7, two separate loops 705 and 710 are created to circulate common mode current. A common mode inductor (Lc2) at 315, capacitor (Cc2) [35], resistance (Rc2) 325 and capacitor (Cc3) at 715 cerate a circulating path 705 for the converter 110 injected common mode noise. Inductor 140, Rc1 135, Cc1 335, and Cc4 at 720 create a path 710 for the inverter 120 injected common mode noise.

Figure 8:
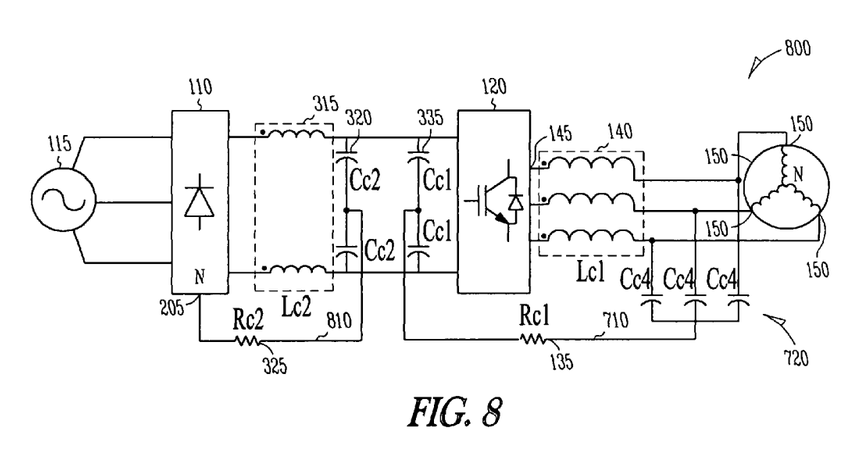
FIG. 8 is a further alternative circuit diagram of a motor drive circuit having a common mode current loop according to an example embodiment.

An embodiment 800 in FIG. 8 is created by modifying the circuit 700 of FIG. 7. In this embodiment, a resistor Rc2 325 is terminated at the neutral point of the AC/DC converter to comprise loop 810. The rest of the circuit 800 remains the same as circuit 700 in FIG. 7.

Figure 9:
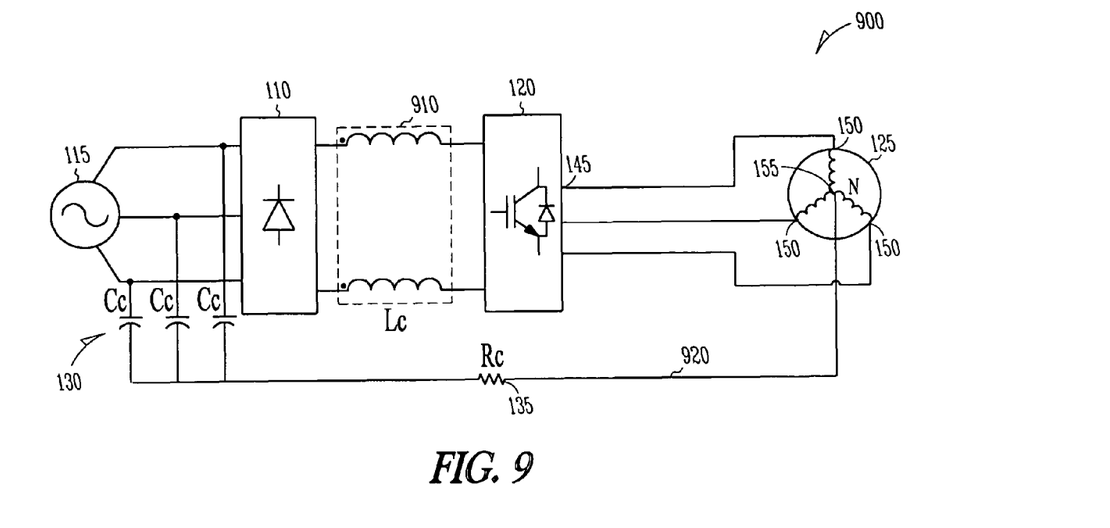
FIG. 9 is a further alternative circuit diagram of a motor drive circuit having a common mode current loop according to an example embodiment.

In an embodiment 900 in FIG. 9, a common mode inductor (Lc) at 910 is connected at the DC input of the IGBT inverter 120. There is no AC side common mode inductor in this embodiment. A common mode loop 920 is created by Lc 910, Rc 135 and Cc 130.

Figure 10:
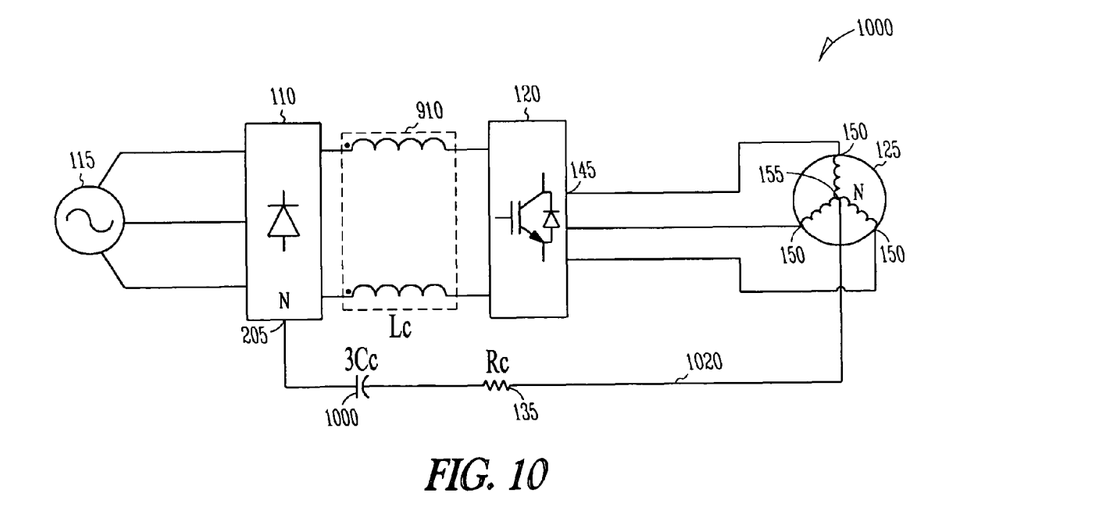
FIG. 10 is a further alternative circuit diagram of a motor drive circuit having a common mode current loop according to an example embodiment.

In an embodiment 1000 in FIG. 10, the same principal is used as in embodiment 900. For an Autotransformer Rectifier Unit (ATRU), inverter 110, it is possible to access the neutral of the system at 205. Resistor Rc 135 is terminated in a capacitor 3Cc 1010. 3Cc 1010 is terminated in the neutral point 205 of the converter 110 to create common mode loop 1020.

Figure 11:
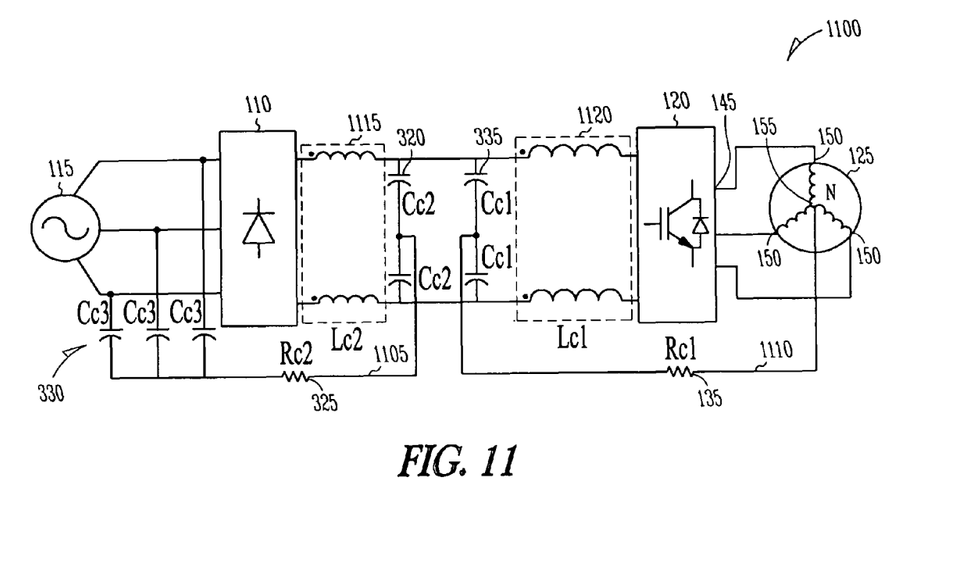
FIG. 11 is a further alternative circuit diagram of a motor drive circuit having a common mode current loop according to an example embodiment.

In an embodiment 1100 in FIG. 11, two separate loops 1105 and 1110 are created to circulate common mode current. A common mode inductor (Lc2) 1115, capacitor (Cc2) 320, resistance (Rc2) 325 and capacitor (Cc3) 330 cerate a circulating path 1105 for the converter 110 injected common mode noise. Lc1 at 1120, Rc1 135 and Cc1 335 create a path 1110 for the inverter 120 injected common mode noise.

Figure 12:
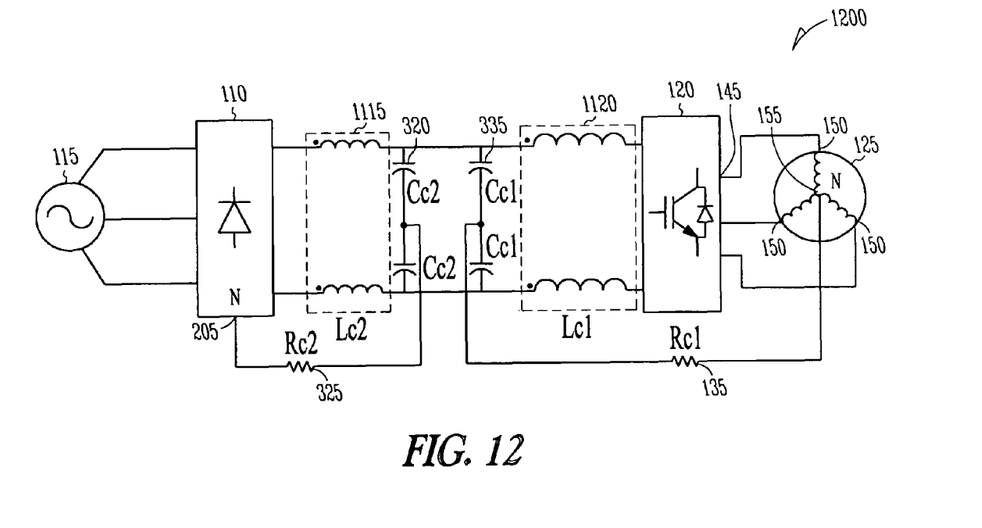
FIG. 12 is a further alternative circuit diagram of a motor drive circuit having a common mode current loop according to an example embodiment.

Embodiment 1200 in FIG. 12 is created by modifying the circuit 1100 of FIG. 11. In this embodiment, Rc2 325 is terminated at the neutral point 205 of the AC/DC converter 110. The rest of the circuit 1200 remains the same as 1100 in FIG. 11.

Figure 13:
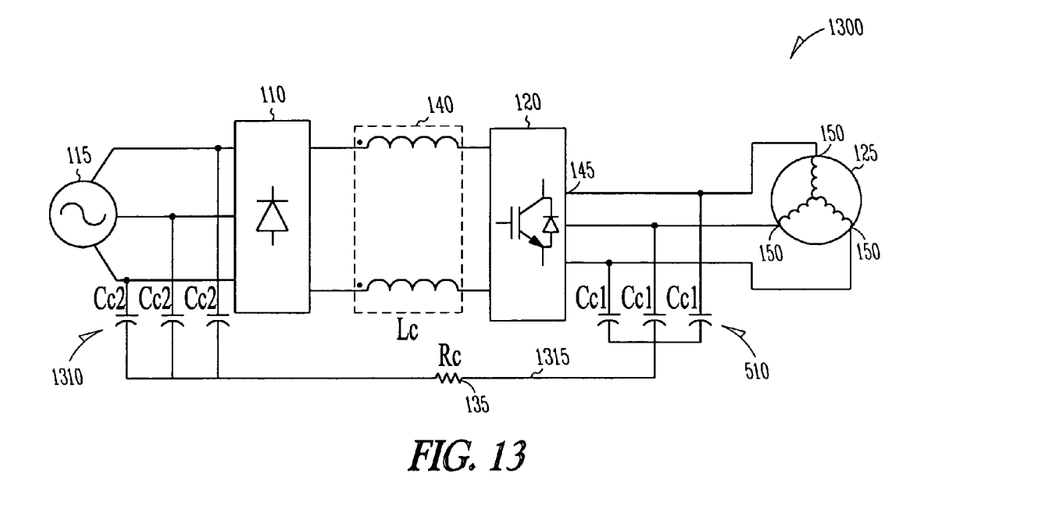
FIG. 13 is a further alternative circuit diagram of a motor drive circuit having a common mode current loop according to an example embodiment.

In embodiment 1300 in FIG. 13, three capacitors (Cc1) 510 are connected at the motor line 150. The other ends of the capacitors are tied up and connected to a damping resistor (Rc) 135. The other end of the Rc 135 is connected to a common point of three capacitors Cc2 at 1310. Cc2 1310 is again terminated to the input of the AC/DC converter 110. Circuit 1300 thus has a single common mode loop 1315.

Figure 14:
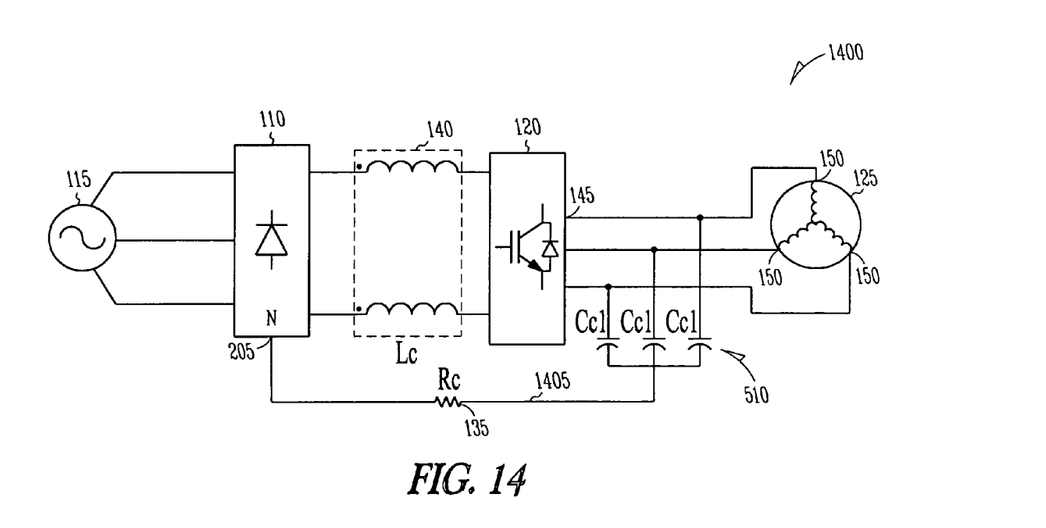
FIG. 14 is a further alternative circuit diagram of a motor drive circuit having a common mode current loop according to an example embodiment.

Embodiment 1400 in FIG. 14 is created by modifying embodiment 13. For Autotransformer Rectifier Unit (ATRU), converter 110, it is possible to access the neutral of the system at 205. Rc 135 is terminated at the neutral point 205 of the converter 110.

Figure 15:
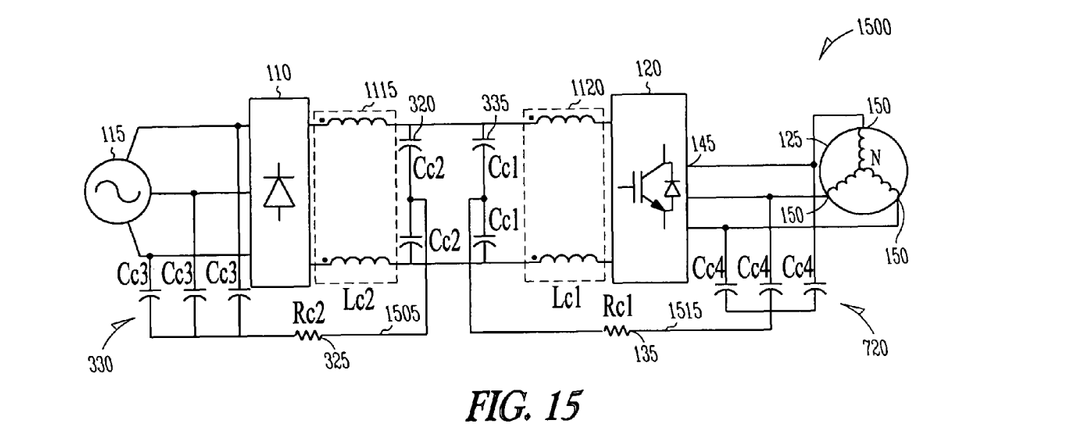
FIG. 15 is a further alternative circuit diagram of a motor drive circuit having a common mode current loop according to an example embodiment.

In embodiment 1500 in FIG. 15, two separate loops 1505 and 1515 are created to circulate common mode current. A common mode inductor (Lc2) at 1115, capacitor (Cc2) at 320, resistance (Rc2) 325 and capacitor (Cc3) 330 creates a circulating path 1505 for the converter 110 injected common mode mode noise. Lc1 1120, Rcd 135, Cc1 335, and Cc4 720 create a path 1515 for the inverter 120 injected common mode noise.

Figure 16:
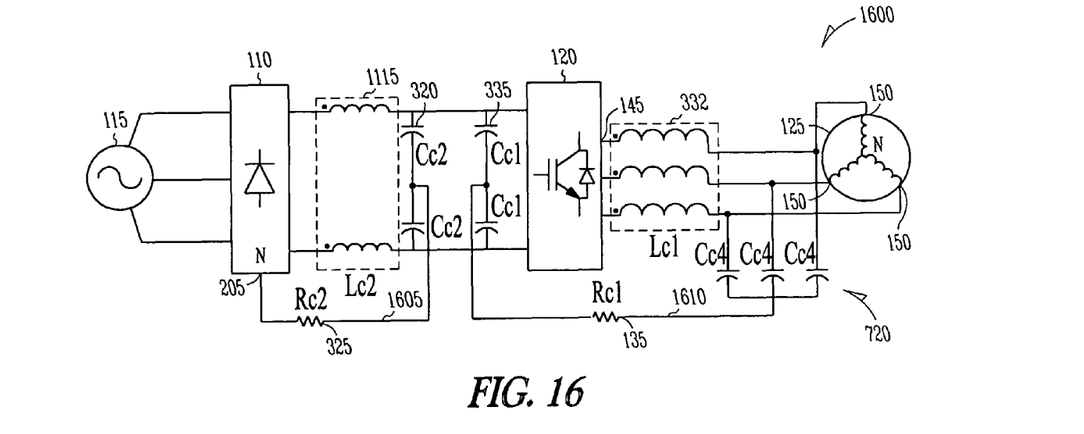
FIG. 16 is a further alternative circuit diagram of a motor drive circuit having a common mode current loop according to an example embodiment.

In yet a further embodiment 1600 (FIG. 16) two separate loops 1605 and 1610 are created by modifying the circuit 1500. In this embodiment Rc2 325 is terminated at the neutral point 205 of the AC/DC converter 110. The rest of the circuit remains same as circuit 1500 in FIG. 15.

In the various embodiments described herein, several different mechanisms have been described for providing common mode current circulation for both a converter and an inverter in a motor driving circuit. Loops comprise strategic use of resistors, inductors and capacitors to provide circulation of the common mode current.

The Abstract is provided to comply with 37 C.F.R. §1.72(b) to allow the reader to quickly ascertain the nature and gist of the technical disclosure. The Abstract is submitted with the understanding that it will not be used to interpret or limit the scope or meaning of the claims.

The invention claimed is:

1. A motor drive circuit comprising:
a converter for coupling to an AC voltage source;
an inverter coupled to the converter for providing a drive current for a motor;
a common mode circulation loop coupled to the converter and to the inverter that circulates common mode current from both the converter and the inverter;
a first circulation loop coupled to the converter; and
a second circulation loop coupled to the inverter, wherein:
the common mode current does not flow through a system ground; and
the first circulation loop comprises an inductor, first capacitor, resistor and second capacitor coupled between an output of the converter and an input of the converter, and wherein the second circulation loop comprises an inductor, resistor and capacitor coupled between an output of the inverter and an input of the inverter.

2. The motor drive circuit of claim 1 wherein the circulation loop comprises:
a common mode inductor coupled between the inverter and the motor;
a common mode resistor coupled to a motor neutral point; and
a common mode capacitor coupled to the common mode resistor and to an input of the converter.

3. The motor drive circuit of claim 1 wherein the circulation loop comprises:
a common mode inductor coupled between the inverter and the motor;
a common mode resistor coupled to a motor neutral point; and
a common mode capacitor coupled to the common mode resistor and to a system neutral of the converter.

4. The motor drive circuit of claim 1 wherein the common mode circulation loop comprises a common mode inductor coupled to an output of the inverter, a common mode capacitor coupled to the common mode inductor and a common mode resistor coupled to the common mode capacitor.

5. The motor drive circuit of claim 4 wherein the common mode circulation loop further comprises a second capacitor coupled between the common mode resistor and the converter.

6. The motor drive circuit of claim 1 wherein the common mode circulation loop comprises a common mode inductor coupled between the converter and the inverter, a common mode resistor coupled to a motor neutral point, and a common mode capacitor coupled to the common mode resistor.

7. The motor drive circuit of claim 1 wherein the common mode circulation loop comprises a common mode inductor coupled between the converter and the inverter, a common mode capacitor coupled between the inverter and the motor, and a common mode resistor coupled to the common mode capacitor and the converter.

8. A method of driving a motor, the method comprising:
converting a signal from an AC voltage source to DC;
providing a drive current for a motor;
providing a first circulation loop coupled to a converter;
providing a second circulation loop coupled to an inverter; and
circulating a common mode current arising from both converting the signal from an AC voltage source to DC and providing the drive current for the motor, wherein the common mode current does not flow through a system ground, and wherein the first circulation loop comprises an inductor, first capacitor, resistor and second capacitor coupled between an output of the converter and an input of the converter, and wherein the second circulation loop comprises an inductor, resistor and capacitor coupled between an output of the inverter and an input of the inverter.

9. The method of claim 8 wherein the common mode current is circulated through the motor.

10. The method of claim 8 wherein the common mode current is circulated around the motor.

11. The method of claim 8 wherein the common mode current is circulated through an input of the converter.

12. The method of claim 8 wherein the common mode current is circulated to a system neutral of the converter.

13. A motor drive circuit comprising:
a converter for coupling to an AC voltage source;
an inverter coupled to the converter for providing a drive current for a motor;
a common mode circulation loop coupled to the converter and to the inverter that circulates common mode current from both the converter and the inverter;
a first circulation loop coupled to the converter; and
a second circulation loop coupled to the inverter, wherein
the first circulation loop comprises an inductor, first capacitor, resistor and second capacitor coupled between an output of the converter and an input of the converter, and wherein the second circulation loop comprises an inductor, resistor and capacitor coupled between an output of the inverter and an input of the inverter.

14. The motor drive circuit of claim 13 wherein the circulation loop comprises:
a common mode inductor coupled between the inverter and the motor;
a common mode resistor coupled to a motor neutral point; and
a common mode capacitor coupled to the common mode resistor and to an input of the converter.

15. The motor drive circuit of claim 13 wherein the circulation loop comprises:
a common mode inductor coupled between the inverter and the motor;
a common mode resistor coupled to a motor neutral point; and
a common mode capacitor coupled to the common mode resistor and to a system neutral of the converter.

16. The motor drive circuit of claim 13 wherein the common mode circulation loop comprises a common mode inductor coupled to an output of the inverter, a common mode capacitor coupled to the common mode inductor and a common mode resistor coupled to the common mode capacitor.

17. The motor drive circuit of claim 13 wherein the common mode circulation loop comprises a common mode inductor coupled between the converter and the inverter, a common mode resistor coupled to a motor neutral point, and a common mode capacitor coupled to the common mode resistor.

18. The motor drive circuit of claim 13 wherein the common mode circulation loop comprises a common mode inductor coupled between the converter and the inverter, a common mode capacitor coupled between the inverter and the motor, and a common mode resistor coupled to the common mode capacitor and the converter.

* * * * *